Dec. 20, 1955  H. V. KINDSETH ET AL  2,727,713
FEEDING DEVICE FOR AUTOMATIC SCALES
Filed Nov. 15, 1951  5 Sheets-Sheet 1
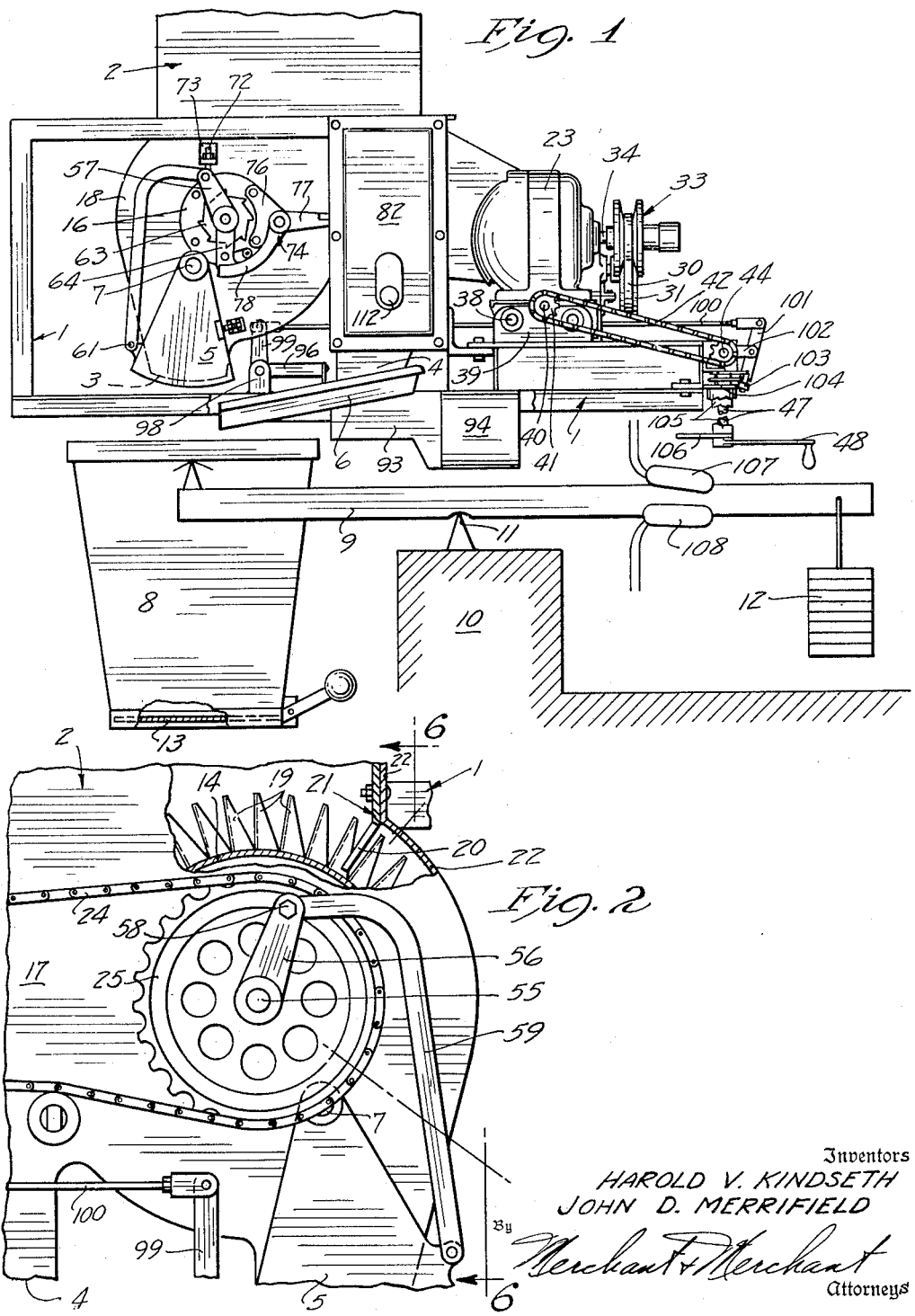
Inventors
HAROLD V. KINDSETH
JOHN D. MERRIFIELD
By Merchant & Merchant
Attorneys Dec. 20, 1955    H. V. KINDSETH ET AL    2,727,713
FEEDING DEVICE FOR AUTOMATIC SCALES
Filed Nov. 15, 1951    5 Sheets-Sheet 2
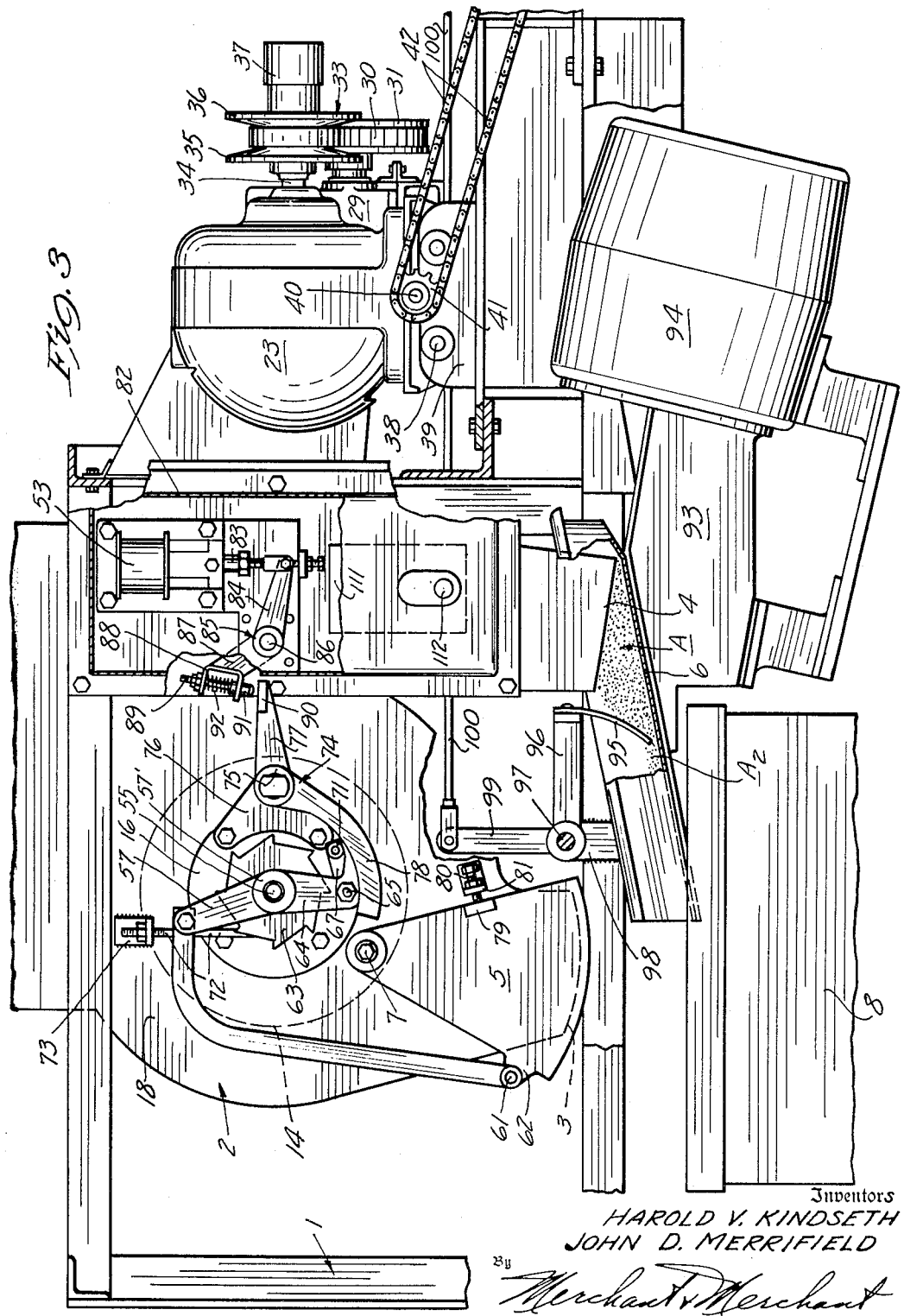
Inventors
HAROLD V. KINDSETH
JOHN D. MERRIFIELD
By Merchant & Merchant
Attorneys

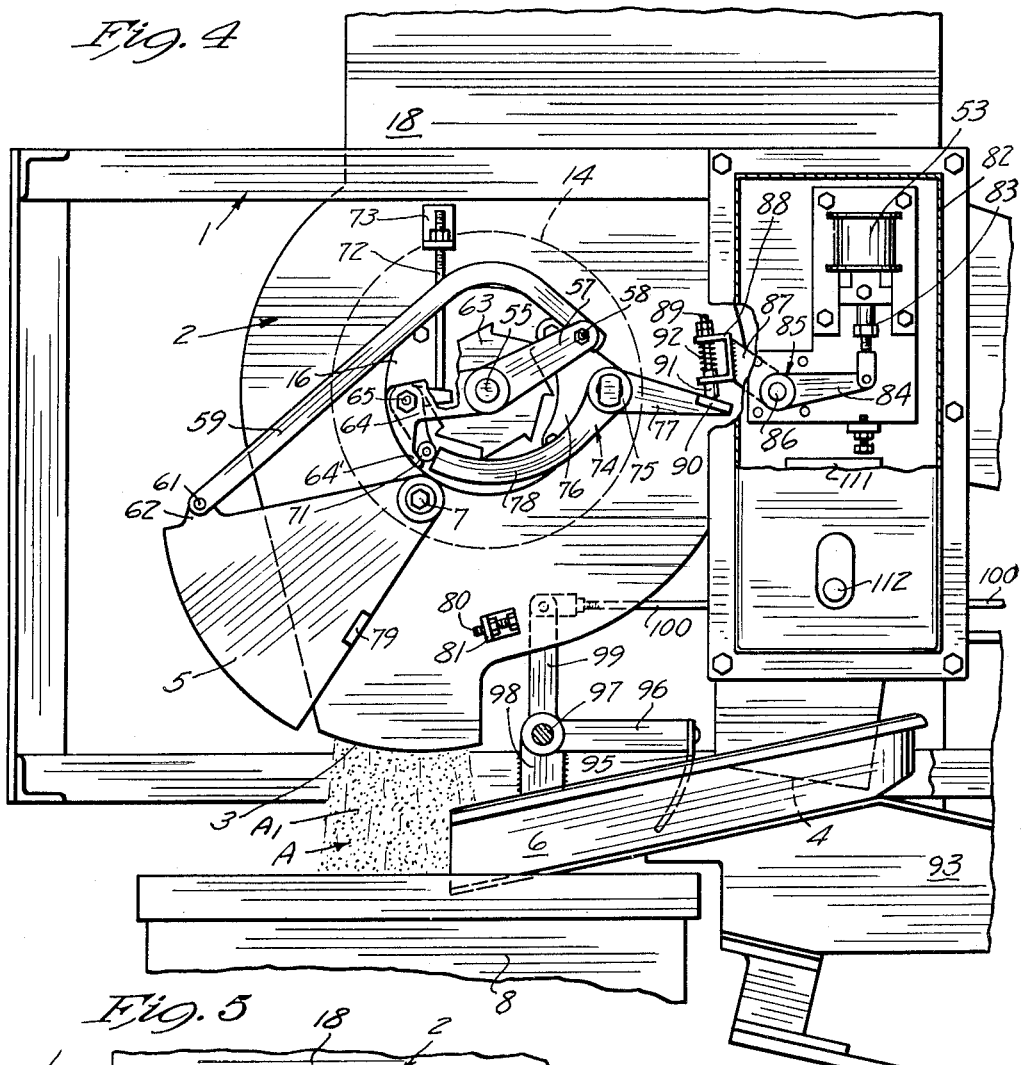
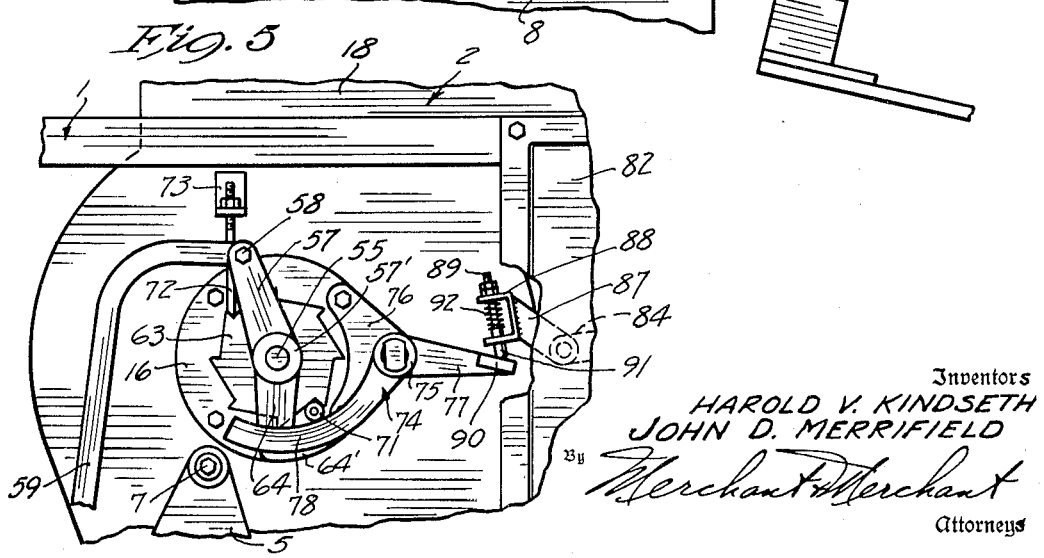

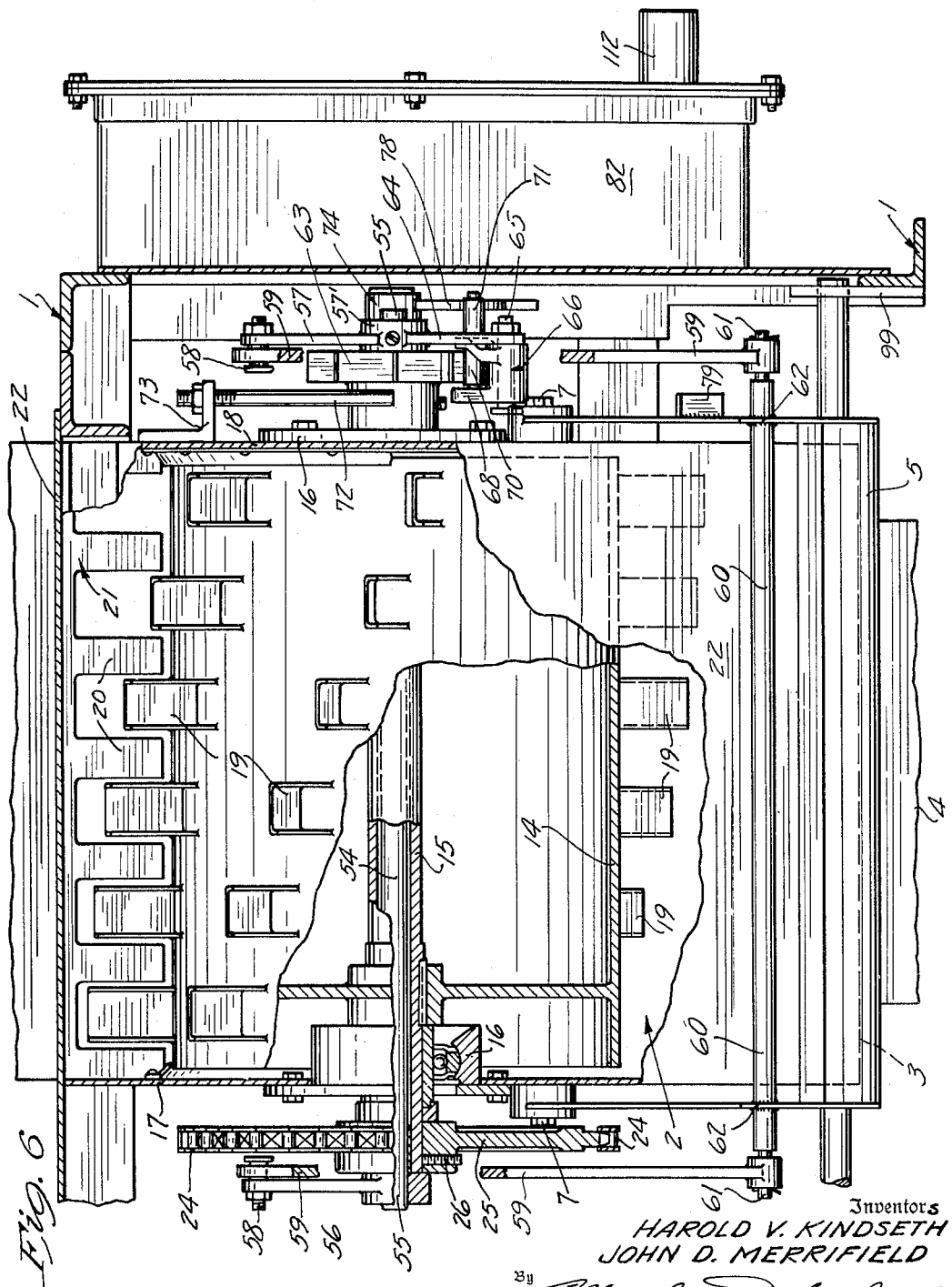

Dec. 20, 1955     H. V. KINDSETH ET AL     2,727,713
FEEDING DEVICE FOR AUTOMATIC SCALES
Filed Nov. 15, 1951     5 Sheets-Sheet 5
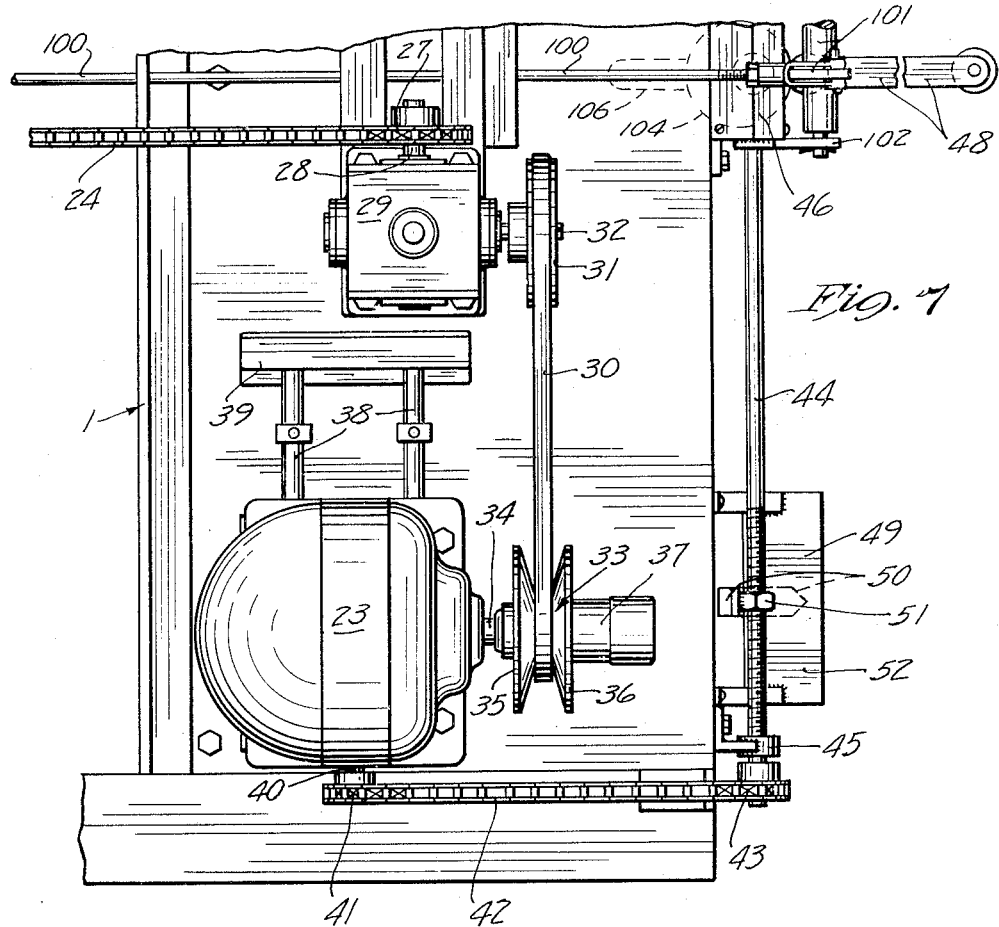
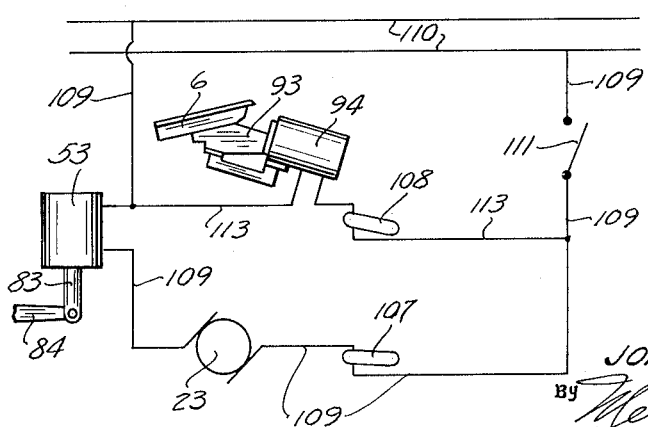
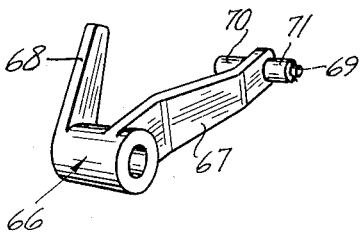
Inventors
HAROLD V. KINDSETH
JOHN D. MERRIFIELD
By Merchant & Merchant
Attorneys

2,727,713

FEEDING DEVICE FOR AUTOMATIC SCALES

Harold V. Kindseth, Minneapolis, Minn., and John D. Merrifield, Rocky Ford, Colo.; said Kindseth assignor to Bemis Bro. Bag Co., Minneapolis, Minn., a corporation of Missouri, and said Merrifield assignor to J. D. Merrifield and Son, Rocky Ford, Colo., a corporation Application November 15, 1951, Serial No. 256,566

3 Claims. (Cl. 249—41)

Our invention relates generally to packing machines and, more specifically, to an automatic weighing scale for delivering equal weights of bulk material or the like to be packaged.

An important object of our invention is the provision of novel means for rapidly delivering the bulk or major portion of material in a bulk feed stream to a weighing scale and for thereafter feeding the balance of material necessary to obtain the required amount by weight in a relatively slow or dribble feed stream to said scale.

Another object of our invention is the provision of novel means responsive to the feeding of a predetermined weight of material to a receptacle to shut off the main feed stream and to thereafter shut off the dribble stream when an added smaller quantity by weight of material has been fed to the receptacle by the dribble feed stream.

Another object of our invention is the provision of a feed hopper having a pair of spaced discharge openings, a gate normally closing one of the openings and movable to permit discharge of a bulk feed stream to said opening, a power operated vibratory dribble feed mechanism associated with the other of said discharge openings and novel means for simultaneously controlling said gate and vibratory dribble feed mechanism.

Another object of our invention is the provision of feeding mechanism including a rotary feeding member associated with the bulk feed stream and novel mechanism for regulating the flow of said dribble feed stream proportionately with respect to variations in the speed of feed of said bulk stream.

Still another object of our invention is the provision of a scale feeding device, as set forth, which is relatively simple and inexpensive to produce, which is rapid and accurate in operation, and which is rugged in construction and durable in use.

Generally stated, the invention consists of the novel devices, combination of devices, and arrangement of parts hereinafter described and defined in the claims.

In the accompanying drawings, which illustrate the invention, like characters indicate like parts throughout the several views.

Referring to the drawings:

Fig. 1 is a partly diagrammatic view in side elevation of a weighing scale and feeder therefor built in accordance with our invention;

Fig. 2 is an enlarged fragmentary view as seen from the opposite side of Fig. 1, some parts being broken away and some parts shown in section;

Fig. 3 is an enlarged fragmentary view in side elevation of a portion of Fig. 1, some parts being broken away and some parts shown in section;

Fig. 4 is a fragmentary detail of a portion of Fig. 3 showing a different position of some of the parts;

Fig. 5 is a fragmentary view in side elevation corresponding to Fig. 3, but showing a still different position of some of the parts;

Fig. 6 is a view partly in end elevation and partly in section taken substantially on the line 6—6 of Fig. 2;

Fig. 7 is a view in plan of a motor and driving connections therefor of our invention;

Fig. 8 is a wiring diagram; and

Fig. 9 is a view in perspective of a bell crank of our invention.

Referring with greater detail to the drawings, the numeral 1 indicates a generally rectangular frame in which is mounted a feed hopper 2. The hopper 2 is provided with a pair of spaced discharge openings 3 and 4, the former of which is normally closed by a generally U-shaped swinging gate 5 and the latter of which is adapted to discharge material into a feeder trough or the like 6. The gate 5 is mounted for swinging movements about a vertical axis on aligned trunnions or the like 7 extending laterally outwardly from opposite sides of the hopper 2.

The discharge opening 3 and the delivery end of the feeder trough or delivery conduit 6 overlie an open top receptacle 8 which is mounted on one end of a scale beam 9 fulcrumed on suitable supporting means 10, as indicated at 11, see Fig. 1. Suitable weights or the like 12 are suspended from the opposite end of the scale beam 9 for counterbalancing the weight of the receptacle 8 and a predetermined amount of material contained therein. The weighing mechanism not in itself constituting the invention, it is not thought necessary to describe the same in greater detail. It will be understood that any suitable type of weighing mechanism having movable elements such as the scale beam 9 may be used for the purpose. The receptacle 8 is conventional in nature, being provided at its lower end with a trap door or the like 13 which may be opened by suitable means, not shown, for the discharge of material contained therein into bags or the like, also not shown.

A feeding drum 14 contained within the hopper 2 overlies the discharge opening 3 thereof and is mounted on a transverse tubular shaft 15 journalled in suitable bearings 16 in opposite side walls 17 and 18 of the hopper 2. The feeding drum 14 is provided with a plurality of axially and circumferentially spaced radially outwardly projecting teeth 19 which, upon rotation of the drum 14, are adapted to pass between adjacent teeth 20 of a stationary comb-like element 21 projecting radially inwardly from a peripheral wall portion 22 of the hopper 2. The teeth 19 cooperate with the teeth 20 to prevent accumulation of material on the drum and consequent uneven feeding of the material through the discharge opening 3, particularly when the material is of a relatively sticky nature such as flour, powdered sugar, and the like.

Means for imparting feeding rotation to the drum 14 includes a drive motor 23 and power transmission mechanism comprising an endless link chain 24 running over a relatively large sprocket wheel 25 rigidly secured by means of a set screw or the like 26 and a relatively small sprocket 27 fast on the output shaft 28 of a conventional speed reducer mechanism, not shown but contained within a housing 29, see Fig. 6; and an endless power transmission belt 30 running over a pulley 31 mounted fast on an input shaft 32 of the speed reducer mechanism and over a conventional variable pitch pulley 33 mounted on a shaft 34 of the drive motor 23. The variable pitch pulley 33 is of the type having opposed belt-engaging flanges 35 and 36 which are urged toward each other by a spring, not shown but contained within a hollow tubular casing 37. Such pulleys are in common use and the structure thereof is well known; hence, it is not thought necessary to describe the same in further detail.

The drive motor 23 is mounted on a pair of spaced parallel supporting rods 38 for sliding movements toward and away from the speed reducer housing 29. The rods 38 are secured at their opposite ends in mounting brackets 39 and the motor 23 is movable on the rods 38 by screw means including a threaded shaft 40 engaging a nut element, not shown but which will be assumed to be secured to the base of the motor 23. This type of device is well known to those skilled in the art. A sprocket 41 is mounted fast on the extended end of the threaded shaft 40 and has running thereover an endless link chain 42 which also runs over a second sprocket 43 mounted fast on one end of an adjustment shaft 44 that is journalled adjacent the sprocket 43 in a bearing bracket 45 rigidly secured to the frame 1, see Fig. 6. The shaft 44 terminates within a gear housing 46 where it is coupled to a vertically disposed shaft 47 by means of conventional gearing, not shown. At its lower end, the shaft 47 is provided with a crank 48 rotation of which in opposite directions will cause the drive motor 23 to be moved toward and away from the speed reducer housing 29. This movement in turn causes the belt 30 to be moved radially closer to or further away from the axis of the variable pitch pulley 33 whereby to vary the speed of the input shaft 32 and consequently the speed of rotation of the feed drum 14. A speed indicator for the feed drum 14 comprises a plate 49 mounted on the frame 1 and a pointer 50 welded or otherwise secured to a nut 51 screw-threaded onto a threaded portion 52 of the adjustment shaft 44.

In the dispensing of powdered or granular bulk material to the receptacle 8 in predetermined quantities by weight, the main bulk of the material is fed to the receptacle 8 through the main discharge opening 3 of the hopper 2 after which the gate 5 is closed and the relatively small quantity necessary to achieve the required weight is fed to the receptacle by the dribble feed trough 6. Mechanism for imparting opening movements to the swinging gate 5 and permitting the same to swing to its gate-closed position of Figs. 1 to 3 inclusive and 5, under the action of gravity, comprises mechanism operated by the drive motor 23 and controlled by a solenoid 53. A shaft 54 extends axially of and is journalled in the tubular shaft 15 projecting outwardly of the opposite ends thereof, as indicated at 55. Rigidly secured to the opposite ends 55 of the shaft 54 is a pair of crank arms 56 which at their outer ends are provided with axially aligned trunnion elements 58. A pair of rigid links 59 are one each pivotally mounted at one of their ends to each of the trunnions 58 and extend laterally outwardly and downwardly therefrom, the opposite ends thereof each being journalled on the opposite diametrically reduced ends of an elongated pin or shaft 60, as indicated at 61. As shown, the shaft 60 extends through laterally outwardly projecting ears 62 on opposite side portions of the gate 5 and is rigidly held therein by welding or the like. Mounted on the outer end of the tubular shaft 15 laterally outwardly of the hopper wall 18 is a ratchet 63. Said ratchet 63 rotates in common with the feed drum 14 in a clockwise direction with respect to Figs. 3 to 5 inclusive. A crank arm 64 is rigidly mounted on the radially inner end or hub portion 57' of the crank arm 57 and extends in a direction substantially diametrically opposite to the crank arm 57. At its outer end, the crank arm 64 is provided with a crank pin or the like 65 on which is pivotally mounted a bell crank 66 comprising axially and circumferentially spaced arms 67 and 68. At its radially outer end, the bell crank arm 67 is provided with a pin 69 extending laterally outwardly from both sides thereof in a direction parallel to the crank pin 65. A pawl in the nature of a roller 70 is journalled on the pin 69 at one side of the bell crank arm 67 and a second roller 71 is similarly journalled on the pin 69 at the opposite side of the arm 67. The bell crank arm 68 is adapted to be engaged by a stop pin 72 adjustably secured to an angle bracket 73 welded or otherwise anchored to the side wall 18 of the feed hopper 2 for a purpose which will hereinafter be described.

A second bell crank 74 comprises a hub portion 75 pivotally mounted on a bearing bracket 76 mounted on the side wall 18 of the hopper 2 for swinging movements about an axis parallel to the axis of the drum 14 and a pair of axially and circumferentially spaced arms 77 and 78, the latter of which describes an arc, which, in one position of the bell crank 74, is substantially concentric with the shaft 54 extending through the said drum 14 and the ratchet 63. The bell crank arm 78 is positioned laterally outwardly of the bell crank arm 64 and is adapted to engage the second roller 71 of the bell crank 66. Swinging movement of the bell crank arm 78 toward the ratchet 63 will cause the bell crank 66 to move pivotally in a direction to bring the pawl roller 70 into engagement with one of the teeth of the ratchet 63, see Fig. 4, whereupon the crank arms 57 and 64 and the shaft 54 will be rotated in a common direction and at a common speed with the feed drum 14, to a point where the second roller 71 moves beyond the radially outer end of the arcuate bell crank arm 78. As the second roller 71 passes the outer end of the bell crank arm 78, the arm 68 of the bell crank 66 makes abutting contact with the end of the stop pin 72 causing the bell crank 66 to swing about its own axis in a direction to move the pawl roller 70 out of engagement with the ratchet 63 and the second roller 71 into engagement with the outer end of the arcuate crank arm 78, as shown in Fig. 4. Ratchet-imparted rotation of the crank arms 57 and 64 causes the movements of the rigid links 59 in a direction to open the gate 5 permitting dumping of material from the hopper 2 through the dump feed discharge opening 3 into the receptacle 8. With reference to Figs. 3 and 4, it will be seen that the gate 5 is provided with a laterally outwardly extending ear 79 which is adapted to engage an adjustable abutment screw 80 on a bracket 81 welded or otherwise rigidly secured to the side wall 18 of the hopper 2 when the gate 5 is in its valve-closed position.

The solenoid 53 is mounted within a switch box or the like 82 that is secured to the frame 1, and is provided with a depending armature 83 which at its lower end is pivotally secured to the outer end of one arm 84 of a third bell crank 85. As shown in Figs. 1 and 3 to 5 inclusive, the bell crank 85 is pivotally mounted on a trunnion or shaft 86 extending in a direction generally parallel to the shaft 54. The other arm 87 of the bell crank 85 is bifurcated at its radially outer end, as indicated at 88, and has extending therethrough an abutment rod 89 which is engageable with the radially outer end portion 90 of the bell crank arm 77 of the second bell crank 74. The abutment rod 89 is provided with an enlarged head 91 between which and one side of the bifurcated portion 88 is interposed a coil compression spring 92 which imparts strain relief to the bell crank mechanism. Energization of the solenoid 53 will cause the bell crank 85 to be rotated in a direction to bring the head 91 of the abutment rod 89 into engagement with the outer end 90 of the bell crank arm 77, whereby to cause the arm 78 of the bell crank 74 to move the pawl roller 70 into operative engagement with the ratchet 63. As hereinbefore described, this engagement will cause the crank arms 57 and 64 to open the gate 5 and permit discharge of a bulk feed stream from the hopper 2 through the discharge opening 3. The weight of the armature 83 of the solenoid 53 will, upon de-energization of the solenoid 53, move the bell crank 85 from its gate-opening position of Fig. 4 back to its position of Fig. 3. The weight of the crank arm 78 of the bell crank 74 being greater than that of the bell crank arm 77 thereof, said bell crank 74 will then swing to its position of Fig. 3 thereby moving its extreme outer end out of engagement of the roller 71 and permit the crank arms 57 and 64 to swing back to their position of Fig. 3, moving the gate 5 to its valve-closed position. It will be noted, by reference to Figs. 3 and 4, that the lower end of the crank arm 64 is provided with a laterally extended foot 64' which is engageable by the roller 71, whereby to limit the swinging movements of the bell crank 66 in one direction. It will further be noted, by particular reference to Fig. 4, that when the roller 71 engages the extreme outer end of the bell crank arm 78, said roller 71 rests upon the foot 64'. It should be obvious that when the solenoid is de-energized and the bell crank arm 78 permitted to drop out of the path of travel of the roller 71, the weight of the gate 5 and the links 59 will cause the gate to swing to its valve-closed position bringing the bell crank roller 71 and the crank arms 57 and 64 into their positions of Figs. 1 and 3. Suitable means, such as a torsion spring, not shown, may be utilized to bias the bell crank 74 toward its roller-releasing position of Figs. 1 and 3, as desired.

The dribble feed trough or conduit 6, which as hereinbefore stated underlies the stream discharge opening 4, is mounted on the armature 93 of a vibratory motor 94 suitably carried by the frame 1. The vibratory motor 94 is of the electromagnetic type and, when energized, sets up a vibratory movement in the feed trough 6 which causes the material to be dispensed to flow or dribble therefrom into the receptacle 8 in a thin stream. The motor 94 is of a well known type in common use and for the sake of brevity will not be described in detail. It will be noted, by reference to Figs. 1, 3, and 4, that the dribble feed trough is tilted downwardly in the direction of the receptacle 8 so that feeding of the material thereto is enhanced.

For varying the flow of grain in the dribble feed stream, we provide a valve-acting gate 95 mounted on the outer ends of a pair of arms 96, one of which is shown, the inner ends of which are rigidly secured to a shaft 97 extending transversely of the frame 1 and journalled in the bearing brackets 98 thereon. A crank-acting arm 99 extends radially upwardly from the shaft 97 and is pivotally secured at its outer end to one end of a rigid link 100 which at its other end is pivotally secured to the upper end of a lever 101 pivotally mounted intermediate its ends to a bracket 102 secured to the frame 1, see Figs. 1 to 4 inclusive and 7. With particular reference to Fig. 1, it will be seen that the lower end of the lever 101 is provided with a cam follower roller 103 which engages a cam 104 fast on the upper end of a tubular shaft 105 which is concentric to the adjustment shaft 47. An adjustment handle 106 is secured to the lower end of the tubular shaft 105. Swinging movement of the adjustment handle 106 will cause rotation to be imparted to the cam 104 to move the valve-acting gate 95 in directions to increase or decrease the volume of the dribble feed stream. The above-described arrangement permits independent adjustment of the speed of feed of both the bulk feed stream and the dribble feed stream so that any desired combination thereof may be obtained.

Means for controlling the drive motor 23, the solenoid 53, and the vibratory dribble feed motor 94 includes a pair of normally open mercury tube switches 107 and 108 cooperating with the scale mechanism, preferably being mounted on the scale beam 9 and move therewith. With particular reference to the diagram of Fig. 8, it will be seen that the switch 107 is interposed in a circuit comprising a lead 109 extending from one side of a power line 110 to the opposite side thereof, and in which lead is also interposed, in series, the drive motor 23, the solenoid 53, and a manually operated master control switch 111. The switch 111 is contained within the switch box 82 and is operated by means of a push button 112. The switch 108 is serially connected to the electromagnetic vibratory motor 94 by a shunt circuit including a portion of the lead 109, the master switch 111, and a shunt lead 113 extending to the lead 109 between the solenoid 53 and the power line 110. Obviously, other types of electrical hookup may be utilized to perform the necessary functions required. The diagram shown is merely a simplified example of such hookup.

Operation

Assuming that the receptacle 8 is empty and that the hopper 2 is filled with material to be dispensed, the master switch 111 is manually closed. With the receptacle 8 in an empty condition, the scale beam 9 will be in a position wherein the mercury switches 107 and 108 are closed, thus completing circuits through the drive motor 23, the solenoid 53, and the electromagnetic vibratory motor 94. Energization of the drive motor 23 causes the feed drum 14 to rotate, and energization of the solenoid 53 causes the bulk feed stream gate 5 to open permitting the bulk feed stream to flow into the receptacle 8. At the same time, a dribble feed stream is being fed to the receptacle 8 due to operation of the vibratory motor 94. The switch 107 is so positioned on the scale beam 9 that when the material fed to the receptacle 8 has reached a quantity by weight within approximately one-half pound of the amount desired, tilting of the scale beam 9 will open the circuit through the drive motor 23 and the solenoid 53 permitting the gate 5 to close thereby shutting off the bulk feed stream. The dribble feed stream then continues until the desired quantity by weight has been fed to the receptacle 8 whereupon the further tilting of the beam 9 will open the switch 108 to shut off the vibratory motor 94, thus stopping the dribble feed stream. At this time, the trap door or closure 13 of the receptacle 8 is opened by suitable means, not shown, causing the charge of material contained therein to be dumped into a bag or other container, not shown. When the receptacle 8 has been emptied, the reduced weight thereof will permit the scale beam 9 to tilt in a direction to reclose the switches 107 and 108 thereby initiating another cycle of operation. As above pointed out, the material to be dispensed might be any one of a number of powdered or granular materials, such as flour, sugar, or various feeds. Said material is indicated in the drawings by the letter A, the bulk feed stream shown at A1, and the dribble feed stream being indicated at A2.

Emphasis is made that, in the above-described machine, both the bulk feed stream and dribble feed stream simultaneously dump into the receptacle 8 and that control of both feed streams is from a single source, namely the scale beam 9.

From the foregoing, it will be seen that we have provided a device capable of accurately weighing and dispensing charges of material of predetermined quantity by weight at a very rapid rate and in a relatively simple manner; and, while we have shown and described a preferred embodiment of our improved feeding device, it will be understood that the same is capable of various modifications and that modification may be made without departure from the spirit and scope of the invention as defined in the claims.

What we claim is:

1. In an automatic weighing device, a feed hopper having a pair of spaced independent discharge openings, a gate normally closing one of said openings and movable to permit discharge of a bulk feed stream from said hopper through said opening, dribble feed mechanism including a vibratory trough associated with the other of said discharge openings and operative to provide a dribble feed stream discharge therefrom, valve mechanism operatively associated with said trough to regulate the volume of the dribble feed stream, a weighing scale including a movable receptacle positioned to receive and collect the material of both feed streams, and mechanism associated with said weighing scale for opening said gate and initiating operation of said dribble feed mechanism when the receptacle is empty, said mechanism being responsive to delivery of a predetermined weight of material to the receptacle to close said gate and cut off the bulk feed stream and operative responsive to delivery by said dribble feed mechanism of an added predetermined weight of material to said receptacle to terminate operation of the dribble feed mechanism.

2. In an automatic weighing device, a feed hopper having a pair of laterally spaced independent discharge openings in its bottom, a gate normally closing one of said openings and movable to permit discharge of a bulk feed stream from said hopper through said opening, operating mechanism for said gate, power operated vibratory dribble feed mechanism including a vibratory trough underlying the other of said discharge openings and operative to provide a dribble feed stream discharge therefrom, valve mechanism operatively associated with said trough to regulate the volume of the dribble feed stream, a weighing scale including a movable receptacle positioned to receive and collect the material from both feed streams, scale operated control means for said gate operating mechanism, and scale operated control means for said vibratory dribble feed mechanism, each of said control means initiating operation of the gate operating mechanism and said dribble feed mechanism when the receptacle is empty, said first-mentioned control means permitting closing of the gate when a predetermined amount by weight of material is delivered to the receptacle, the last-mentioned control means terminating operation of the vibratory dribble feed mechanism when an added predetermined quantity by weight of material is delivered to the receptacle.

3. In an automatic weighing machine, a feed hopper having a pair of laterally spaced independent discharge openings in its bottom, a gate normally closing one of said openings and movable to permit discharge of a bulk feed stream from said hopper through said opening, a rotary feeding member in said hopper for feeding and directing material to said one of the openings, means for driving said feeding member including a motor and variable speed transmission mechanism, dribble feed mechanism including a vibratory trough underlying the other of said discharge openings and operative to provide a dribble stream discharge therefrom, said dribble feed mechanism including a valve-acting member overlying said trough and movable into and out of the dribble feed stream, adjustment means for moving said valve-acting member into and out of the dribble stream to control the volume thereof, a weighing scale including a movable receptacle positioned to receive and collect the material of both feed streams, and mechanism associated with said weighing scale for opening said gate and initiating operating of said dribble feed mechanism when the receptacle is empty, the mechanism associated with the weighing scale being responsive to delivery of a predetermined weight of material to the receptacle to close said gate and cut off the bulk feed stream and operative responsive to delivery by said dribble feed mechanism of an added predetermined weight of material to said receptacle to terminate operation of the dribble feed mechanism.

References Cited in the file of this patent

UNITED STATES PATENTS

| | | |
|---|---|---|
| 1,020,692 | Gwinn | Mar. 19, 1912 |
| 1,199,561 | Joplin | Sept. 26, 1916 |
| 1,561,211 | Bremer | Nov. 10, 1925 |
| 1,913,868 | Andreas | June 13, 1933 |
| 2,022,659 | Fisher | Dec. 3, 1935 |
| 2,058,775 | Cundall | Oct. 27, 1936 |
| 2,071,443 | Weckerly | Feb. 23, 1937 |
| 2,314,654 | Merrifield | Mar. 23, 1943 |
| 2,436,983 | Wedenburg | Mar. 2, 1948 |
| 2,464,545 | Ahlburg | Mar. 15, 1949 |

FOREIGN PATENTS

| | | |
|---|---|---|
| 458,256 | Great Britain | Dec. 15, 1936 |